July 6, 1926.  1,591,745
R. CURRY
NONPNEUMATIC RESILIENT TIRE
Filed Nov. 10, 1924  2 Sheets-Sheet 1

WITNESSES:
Cris Leinle.
Hugh H. Ott

INVENTOR,
Robert Curry.
BY Munn & Co
ATTORNEYS.

July 6, 1926.
R. CURRY
NONPNEUMATIC RESILIENT TIRE
Filed Nov. 10, 1924 2 Sheets-Sheet 2
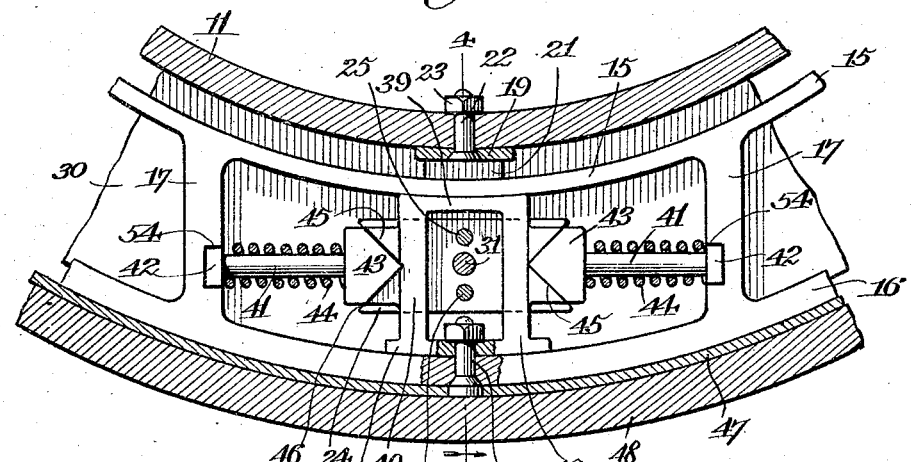
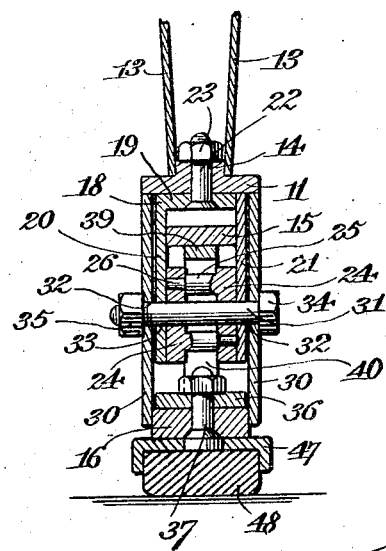
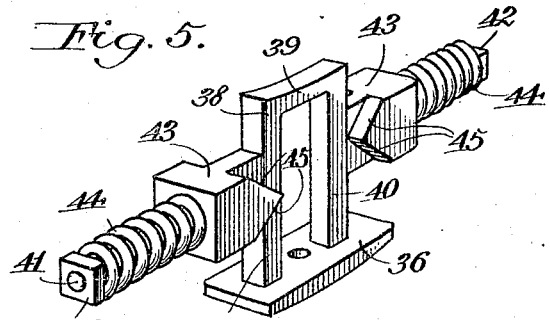
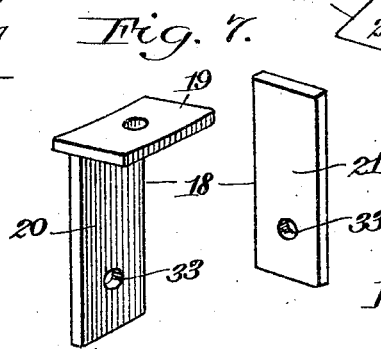
INVENTOR,
Robert Curry
BY
ATTORNEYS.

Patented July 6, 1926.

1,591,745

UNITED STATES PATENT OFFICE.

ROBERT CURRY, OF NEW YORK, N. Y.

NONPNEUMATIC RESILIENT TIRE.

Application filed November 10, 1924. Serial No. 748,982.

This invention relates to vehicle tires and has particular reference to a non-pneumatic resilient tire, the same being in the nature of an improvement over similar devices upon which Letters Patent of the United States No. 1,083,059 and No. 1,421,917 were respectively granted to me on December 30, 1913 and July 4, 1922.

The invention broadly comprehends an improved non-pneumatic resilient tire which affords at least the same amount of cushioning effect as a pneumatic tire and this without such objectionable features as blow-outs, punctures, constant attention and inflation.

More specifically the invention contemplates an improved mechanism for yieldably tensioning the eccentrically movable tread element against relative movement with respect to the supporting element which is permanently concentric to the axis of the wheels, whereby said mechanism always functions to the fullest extent irrespective of its position or relation in its cycle of movement, to set up a cushioning action for absorbing shocks and jars.

As a further object the invention provides an improved resilient tire structure in which the parts or elements thereof are capable of ready removal or application whereby broken or worn parts may be readily replaced and whereby the initial assembly of the device may be economically accomplished.

The invention furthermore contemplates a non-pneumatic resilient tire structure which is comparatively simple in its construction, inexpensive to manufacture and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Fig. 3 is a similar sectional view taken approximately on the line 3—3 of Fig. 2.

Fig. 4 is a fragmentary transverse sectional view taken approximately on the line 4—4 of Fig. 3.

Fig. 5 is a perspective view of the yieldable cam block assemblage removed from the structure.

Fig. 6 is a perspective view of one of the cam plates.

Fig. 7 is a collective perspective view of the cam plate carrier elements.

Figure 1:
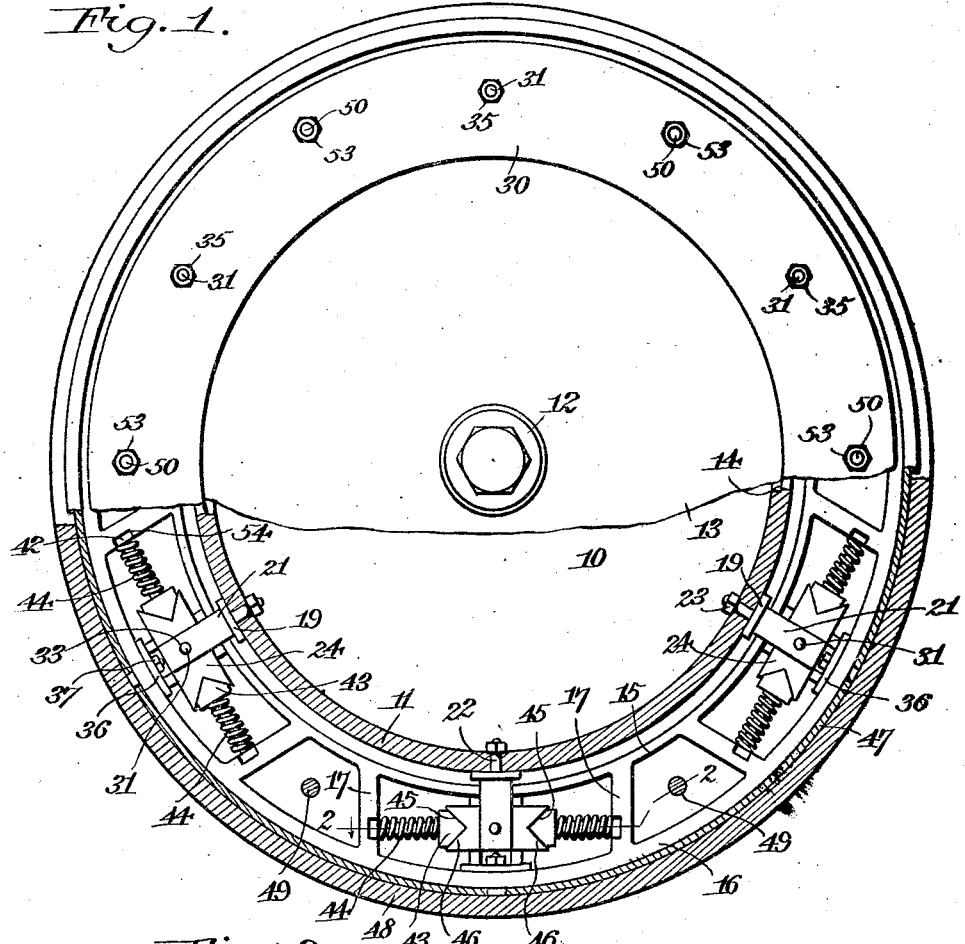
Figure 1 is a side elevation of a wheel equipped with a tire constructed in accordance with the invention, parts being broken away and shown in section to disclose the underlying structure.
Figure 2:
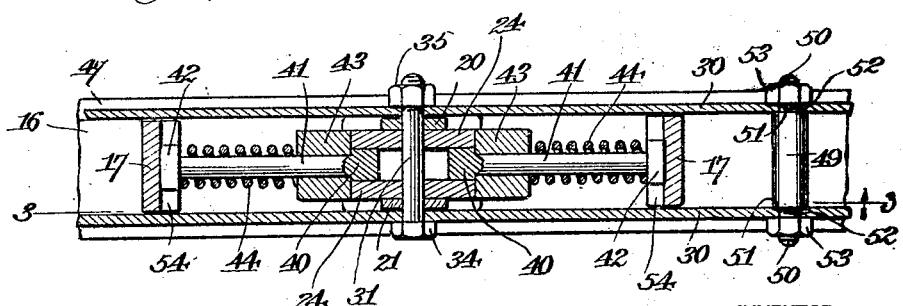
Fig. 2 is a fragmentary enlarged sectional view taken approximately on the line indicated at 2—2 of Fig. 1.

Referring to the drawings by characters of reference 10 designates a wheel which is preferably, although not necessarily, of the disk type and which includes the felly 11 concentrically supported from the hub 12 by the disks or plates 13, the outer peripheries of which disks are fitted within the inner periphery of the felly and the outer edges of which are spaced by the annular inwardly projecting rib 14.

The tire constituting the present invention consists of an annular eccentrically movable tread member which includes concentric inner and outer rims 15 and 16 connected to each other by integral arms 17 arranged in parallel pairs. On the outer periphery of the felly are secured a plurality of circumferentially spaced supporting brackets 18 which include a base 19 and integral or permanent radially projecting arms 20 and removable arms 21 which are laterally spaced with respect to each other. The brackets are secured in place by means of bolts 22 passed through the base 19 and the felly 11 with the nuts 23 threaded on the inner ends of the bolts. A pair of cam plates 24 are supported from each bracket 18 and said cam plates are maintained in relative laterally spaced relation by spacing elements 25 which in the present instance consist of a stud projecting inwardly from each cam plate and having a reduced free end 26 providing a shoulder 27. Each cam plate is also provided with a complementary receiving opening 28 for the reduced terminal 26 of the opposite cam plate and the cam plates are further provided with transverse central apertures 29. A pair of annular concealing plates 30 are provided each of which is disposed in laterally spaced relation alongside the arms 20 and 21 of the brackets 18 with the inner periphery of the concealing plates 30 in abutting relation to the outer periphery of the felly 11 and with the outer faces flush with the outer side edges of said felly. A transverse bolt 31 is passed through alined apertures 32 in the concealing plates, alined apertures 33 in the arms 20 and 21 and the alined apertures 29 in the cam plates. The bolts 31 are provided with heads 34 at one end and removable nuts 35 threadedly engaging the opposite end whereby the assembly or disassembly of the device may be readily accomplished.

The means for mounting and supporting the eccentrically movable tread member of the tire consists of a plurality of cam block assemblages carried by said tread member corresponding in number to and cooperating with each pair or set of cam plates 24. The cam block assemblages each comprise a bracket or carriage which includes a foot 36 bolted or otherwise secured as at 37 to the inner periphery of the outer rim member 16 and an inwardly projecting substantially U-shaped member 38 the bight 39 of which is concave or arcuate to fit the outer periphery of the inner rim member 15. The legs 40 of the U-shaped member 38 are provided with longitudinally outwardly projecting shafts 41 each of which is threaded at its outer end to receive a nut 42. A cam block 43 is mounted on each leg and said cam blocks are normally forced toward the legs 40 of the U-shaped member 38 by means of a coiled compression spring 44 which is interposed between the nut 42 and the cam block and surrounds the shaft 41. By threading or unthreading the nuts 42 on the shafts 41 it will be seen that the compression of the springs 44 may be regulated to increase or decrease the strength of said springs. The cam blocks are each provided with two laterally spaced pairs of cam or wedge faces 45 and the cam plates 24 are each provided at their opposite ends with a complementary pair of cam or wedge faces 46 which are designed to coact and cooperate with each other to yieldably maintain under the compression of the springs 44, the tread member in a normal concentric relation to the felly and hub of the wheel while permitting relative eccentric movement therebetween when the tire is in use. The outer rim member 16 of the eccentrically movable tread member carries a channel rim 47 within which a solid cushion tread element 48 is arranged. In order to further secure the concealing plates 30 together and at the same time to space the same laterally to prevent frictional contact of the inner faces thereof with the bracket arms 20 and 21 and with the side edges of the outer rim member 16, a plurality of spacing bolts 49 are employed which bolts are provided with reduced threaded outer ends 50 providing spacing shoulders 51 at the juncture of the outer ends 50 with the main body of the bolt. The shoulders 51 engage with the inner faces of the concealing plates 30 while the reduced ends 50 extend through openings 52 and receive the nuts 53 threaded thereon. The bolts 49 extend transversely through the space between each pair of connecting arms 17 for the inner and outer rim members 15 and 16. The arms 17 on the confronting inner faces of each pair are provided with transverse grooves 54 for receiving and accommodating the nuts 42 whereby the said nuts when adjusted to regulate the compression of the springs 44 are locked against turning movement while at the same time the outer ends of the shafts 41 are supported to relieve the cam block assemblages of some of the strain.

In operation, the weight of the body of the vehicle is resiliently supported by all of the springs 44 due to the fact that the felly tends to move from a normal concentric relation with respect to the tread member to an eccentric relation thereby causing the cam faces 46 of the cam plates to effect a relative separation of the cam blocks by a cam engagement with the cam faces 45 thereof. This separation occurs simultaneously in various degrees according to the location of the cam plates and blocks in the cycle of movement of the wheel. The main improvement in the present construction over that of the prior patents is that the separation of the cam blocks of the lowermost and uppermost sets in the present instance is identically the same whereas in the prior patents the wedge blocks carried by the rim and disposed in the uppermost portion of the wheel move away from between the separable bevel blocks and perform no function. It thus follows that due to the fact that the cam plates provided with double cam faces and carried wholly by the felly and the relatively separable cam blocks having double cam faces which are carried wholly by the tread member function to their fullest capacity in all points in the cycle of the wheel to set up the cushioning effect.

I claim:

1. In a tire an annular tread member and means for mounting the same for cushioned eccentric movement relative to a wheel felly including pairs of oppositely facing stationary cam members rigidly connected to the felly and extending tangentially thereof, pairs of spaced movable cams carried by the tread member for co-action with the stationary cams, said movable cams being mounted for simultaneous spring opposed separation as they are slidingly engaged by the stationary cams when the tread member moves toward or away from the felly, and mounted for individual axial movement as certain of them are directly axially pushed by the stationary cams when the tread member moves circumferentially relative to the felly.

2. A device of the character set forth in claim 1 wherein the stationary cam members comprise pairs of plates having their ends shaped to provide cam faces, and the movable cams are mounted on a support straddled by the plates and carrying tangentially extending rods upon which the movable cams slide.

3. A device of the class described in claim 1 wherein the stationary cam members are carried by U shaped brackets fixed to the felly and the movable cams are carried by brackets fixed to the tread member and straddled by the U shaped brackets.

ROBERT CURRY.